United States Patent
Watanabe

(10) Patent No.: US 8,041,209 B2
(45) Date of Patent: Oct. 18, 2011

(54) DOOR MIRROR

(75) Inventor: Atsushi Watanabe, Fujieda (JP)

(73) Assignee: Murakami Corporation, Shizuoka (JP)

( * ) Notice: Subject to any disclaimer, the term of this patent is extended or adjusted under 35 U.S.C. 154(b) by 0 days.

(21) Appl. No.: 12/619,743

(22) Filed: Nov. 17, 2009

(65) Prior Publication Data
US 2010/0196000 A1    Aug. 5, 2010

(30) Foreign Application Priority Data
Jan. 30, 2009    (JP) .................................. 2009-019918

(51) Int. Cl.
*G03B 17/48* (2006.01)
(52) U.S. Cl. ........................................................ 396/429
(58) Field of Classification Search .................... 396/429
See application file for complete search history.

(56) References Cited

U.S. PATENT DOCUMENTS

| | | | |
|---|---|---|---|
| 6,100,921 A * | 8/2000 | Rowley | 348/81 |
| 6,676,308 B2 * | 1/2004 | Baek | 396/427 |
| 6,959,994 B2 * | 11/2005 | Fujikawa et al. | 359/871 |
| 2003/0103142 A1 * | 6/2003 | Hitomi et al. | 348/148 |
| 2009/0040778 A1 | 2/2009 | Takayanagi et al. | |

FOREIGN PATENT DOCUMENTS

| | | |
|---|---|---|
| JP | 10-44891 | 2/1998 |
| JP | 2004-306888 | 11/2004 |
| JP | 2007-137286 | 6/2007 |
| JP | 2008-296789 | 12/2008 |

OTHER PUBLICATIONS

Japan Office action, mail date is Mar. 1, 2011.

* cited by examiner

*Primary Examiner* — Rodney Fuller
(74) *Attorney, Agent, or Firm* — Greenblum & Bernstein, P.L.C.

(57) ABSTRACT

A door mirror which includes a camera for checking the side of a vehicle which is in a blind spot of a driver, has a door mirror body having a through hole formed for lens side part of the camera to be inserted therein, and a camera cover having an opening part for exposing the lens part formed, and the camera cover has the first abutting surface which abuts on the outer surface of the door mirror body with elasticity.

2 Claims, 6 Drawing Sheets

DOOR MIRROR

CROSS-REFERENCE TO RELATED APPLICATION

The disclosure of Japanese Patent Application No. JP2009-19918 filed on Jan. 30, 2009 including the specification, drawings and abstract is incorporated herein by reference in its entirety.

BACKGROUND OF THE INVENTION

1. Field of the Invention

The present invention relates to a door mirror, which includes a camera for checking the side of a vehicle which is in a blind spot from a driver.

2. Related Background of the Invention

As a technical art in this field heretofore, there has been Japanese Unexamined Patent Application Publication No. 2007-137286. The door mirror described in the patent document comprises a resin door mirror body which is bowl-shaped, and a mirror disposed in an opening part of the door mirror body. The door mirror includes a metallic camera base stand which is attached on an outer surface of the door mirror body and has a sphere-shaped convex part protruding downward, and a camera having a substantially spherically concave part so as to be rotatably installed on the base stand through fitting the concave part together with the base stand convex part. Accordingly, as the camera is installed on the base stand in rotation-free manner, angle change of the camera to the door mirror body becomes possible and thus the convenience of the camera is enhanced.

SUMMARY OF THE INVENTION

However, in the conventional door mirror, it is difficult to cause the camera base stand made of metal to adhere tightly to the resin door mirror body accurately, and a large gap between the base stand and the door mirror body tends to be generated. Consequently, the gap easily generates wind noise while a vehicle is running and there is a risk of quietness deterioration.

The object of the present invention is to provide a door mirror capable of enhancing quietness at the time of running.

A door mirror, which includes a camera for checking the side of a vehicle which is in a blind spot of a driver, comprising: a door mirror body having a through hole formed for lens side part of the camera to be inserted therein; and a camera cover, which is attached to the door mirror body and having an opening for exposing the lens part formed; wherein the camera cover is equipped with the first abutting surface which abuts on outer surface of the door mirror body with elasticity.

Since the camera cover adopted in the door mirror according to the present invention has the first abutting surface capable of performing elastic deformation, matching performance to the outer surface profile of the door mirror body is excellent and thereby the gap between the camera cover and the door mirror body can be made small. As a result, this door mirror can suppress the generation of its wind noise, and thus quietness improvement at the time of driving can be achieved.

It is preferable that the camera cover has a slot portion into which an edge part of the door mirror body forming a through-hole enters, and the second abutting surface which abuts on the inner surface of the door mirror body with elasticity is formed in a wall surface of the slot portion, such that the door mirror body is sandwiched between the first abutting surface and the second abutting surface.

According to such constitution, the edge part forming a through-hole of the door mirror body enters into the slot portion of the camera cover, and moreover the door mirror body is sandwiched with resilient force between the first abutting surface and the second abutting surface formed in a wall surface of the slot portion. Consequently, falling-off of the camera cover is prevented and the attachment of the camera cover is achieved without screws and adhesive agent, and because of this, structure of the door mirror can become simple.

In addition, it is preferable that a bracket is further provided which is disposed inside of the door mirror body to fix the camera to the door mirror body, and the second abutting surface is pressed onto the inner surface of the door mirror body by the bracket. According to such constitution, the second abutting surface of the camera cover can be pressed onto the inner surface of the door mirror body by utilizing a bracket for fixing the camera to the door mirror body, and therefore by strengthen the pressing force, the camera cover can be fixed firmly to the door mirror body so that falling-off of the camera cover can be further prevented.

DESCRIPTION OF THE PREFERRED EMBODIMENTS

Figure 1:
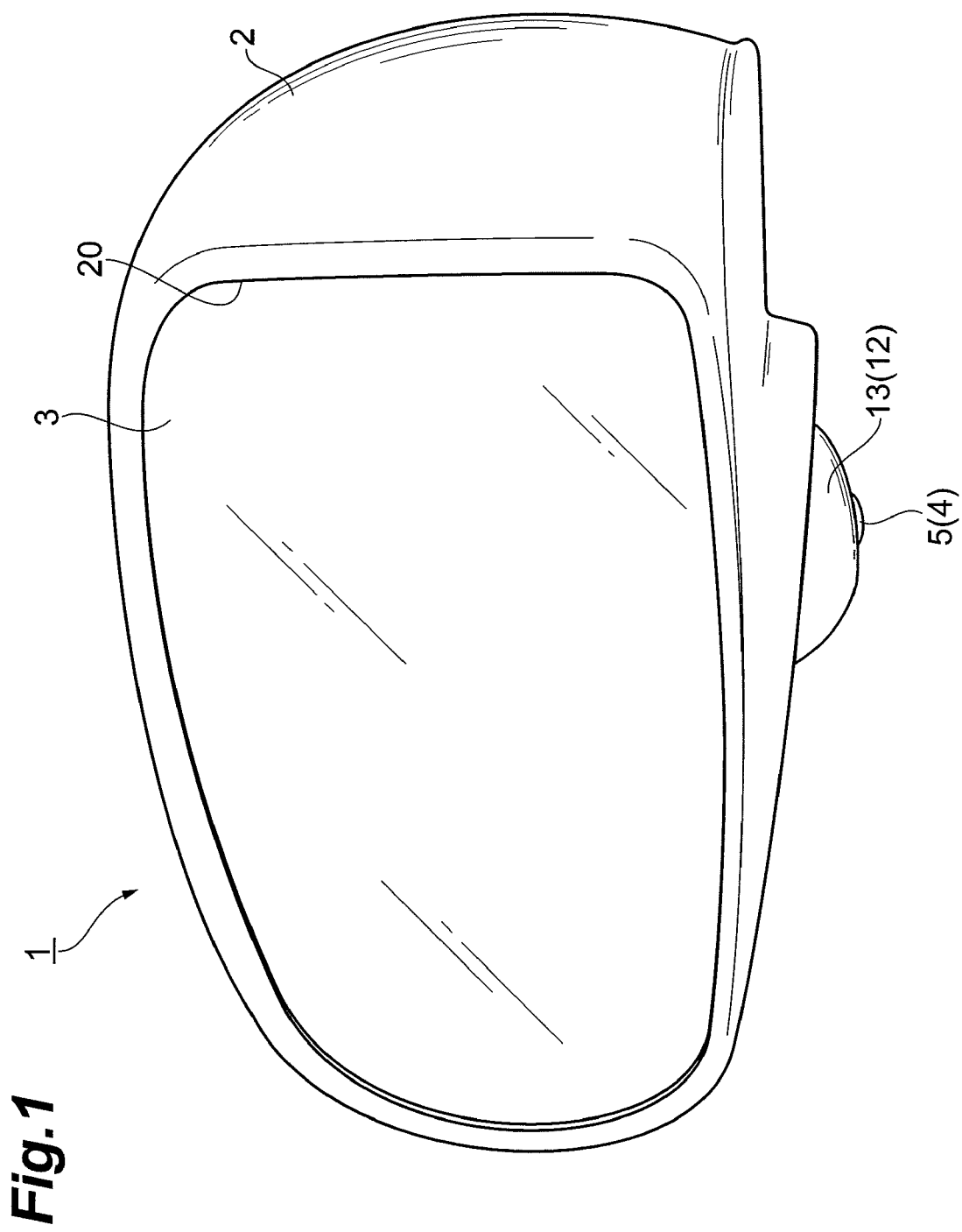
FIG. 1 is a perspective view showing an embodiment of the door mirror according to the present invention.

Hereinafter, preferred embodiments of the door mirror according to the present invention will be described in detail referring to the drawings.

Figure 2:
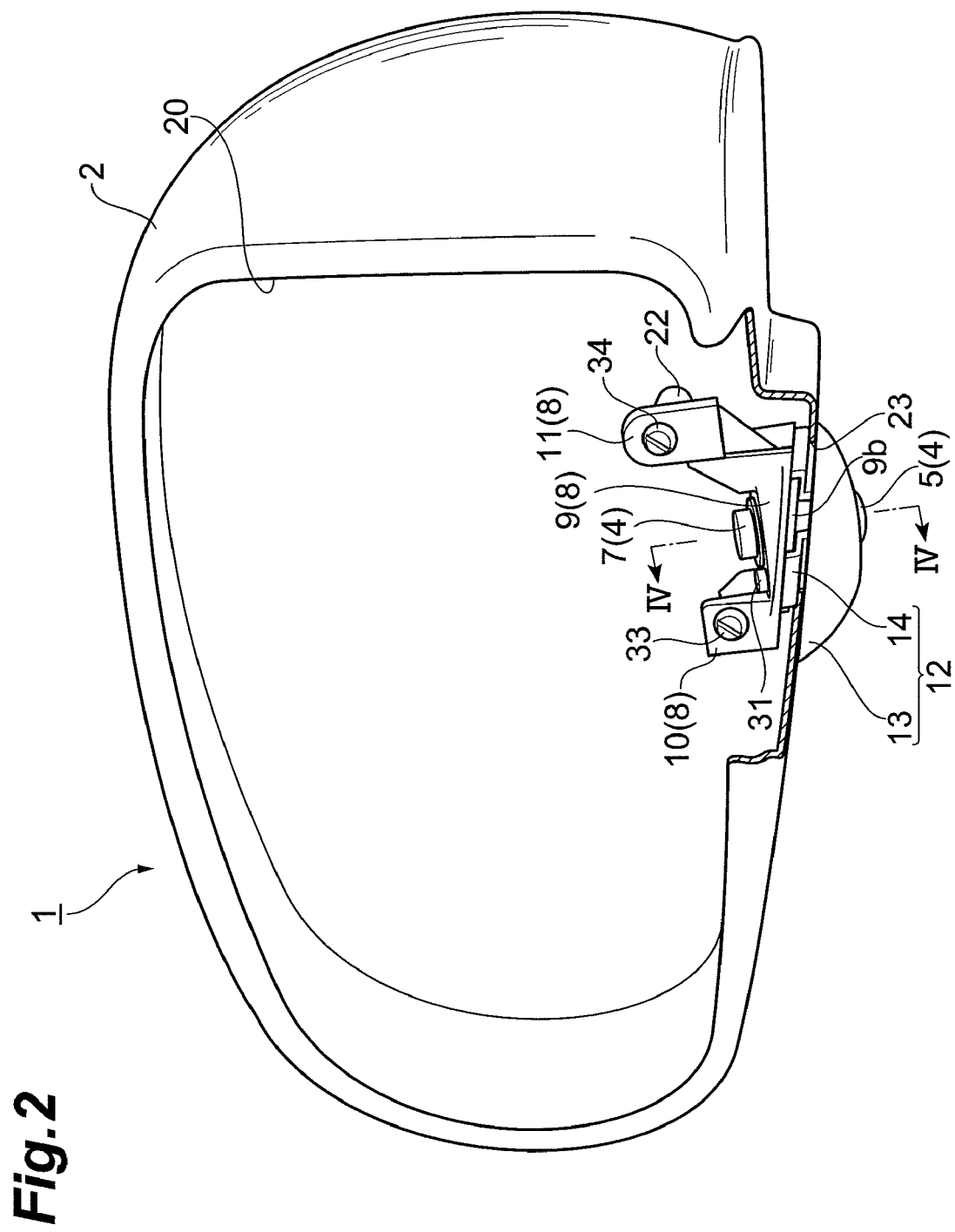
FIG. 2 is a partial cross-sectional view of the door mirror shown in FIG. 1.
Figure 3:
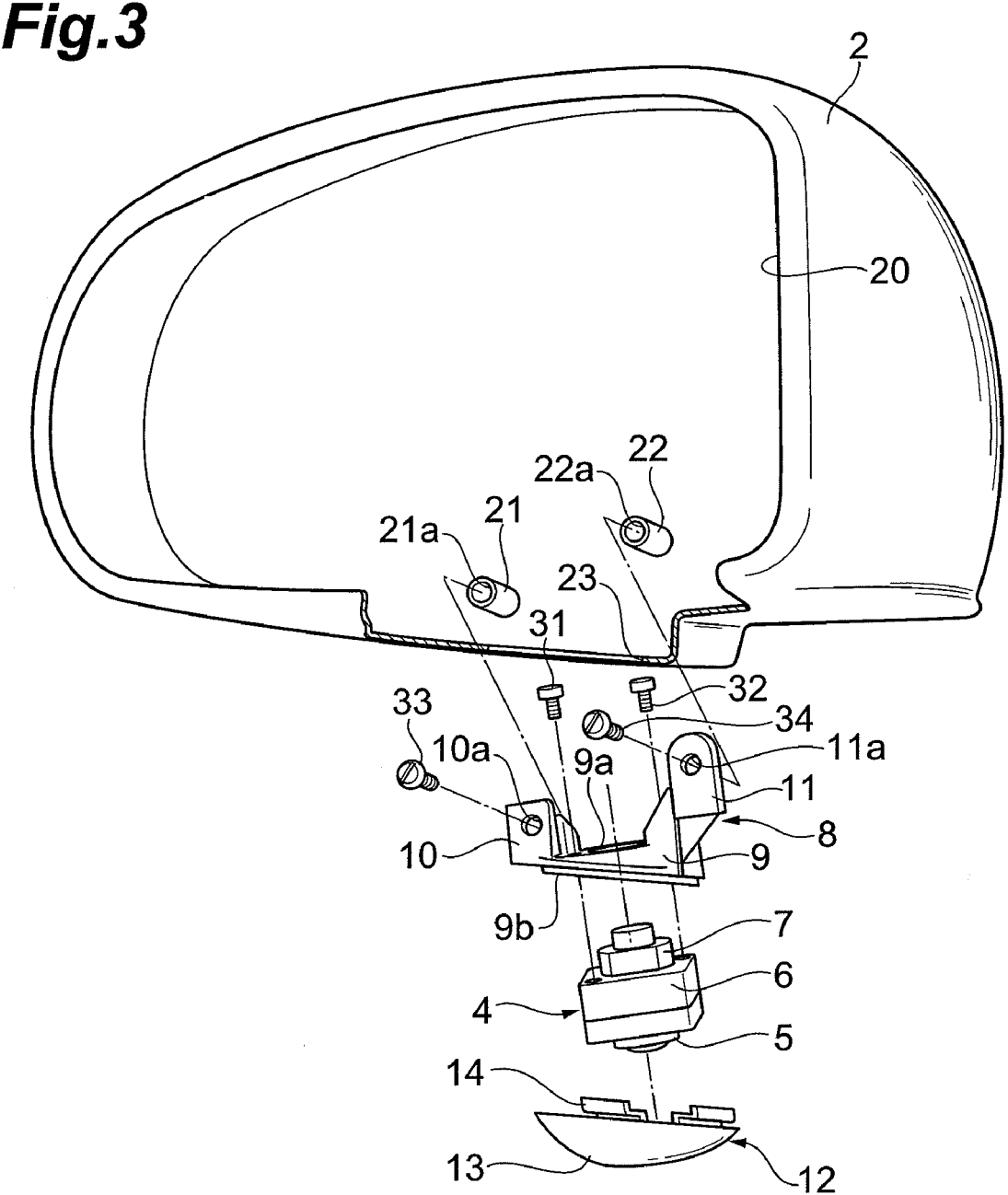
FIG. 3 is a perspective exploded view of the principal part of the door mirror.

As shown in FIGS. 1 to 3, the door mirror 1 includes a resin door mirror body 2 which is fixed to the door panel (not shown) of the front side of a vehicle. The door mirror body 2 is formed in a bowl shape which has an opening part 20 opened toward the rear side of the vehicle. In the door mirror body 2, a plate-shaped reflection mirror 3 is disposed so that the opening part 20 is closed. In addition, an actuator for driving a mirror (not shown) to change mirror surface angle of the reflection mirror 3 is provided in the door mirror body 2.

In a lower surface part of the door mirror body 2, a waterproof camera 4 for checking the side of the vehicle which is in a blind spot from a driver is incorporated. This camera 4 comprises lens part 5 disposed at the front side, a substantially rectangular-shaped camera body 6 having built-in CCD, and a substantially cylindrical wiring connection part 7 which is disposed at the rear end of the camera body 6. The wiring connection part 7 is connected electrically with electronic controlling unit of the vehicle via wiring (not shown). The camera 4 is fixed to the door mirror body 2 via a resin bracket 8.

The bracket 8 is composed of a substantially donut-shaped camera attaching portion 9 having a through-hole 9a at the center through which the wiring connection part 7 of the camera 4 is inserted, and a pair of plate-shaped door mirror attaching portions 10, 11 which protrude from the camera attaching part 9 and allow attachment to the door mirror body 2. In the camera attaching part 9, insertion holes to which screws 31, 32 are inserted is formed. The screws 31, 32 inserted in the insertion holes are screwed into screw holes 6a, 6b in the camera body 6, through which the camera attaching part 9 is fastened to the camera body 6 by screws (see FIGS. 5 and 6). In the lower end of the camera attaching part 9, a ring-shaped protrusion part 9b which abuts on the camera cover 12, described later is formed.

In each of the door mirror attaching parts 10, 11, insertion holes 10a, 11a to which the screws 33, 34 are formed, respectively. Meanwhile, inside the door mirror body 2, two protruding bosses 21, 22 for the camera are formed from the inner wall of the door mirror body 2 toward the side of the opening part 20. At the center of each boss 21, 22, screw hole 21a, 22a are formed for fastening the bracket 8 by screws. The door mirror attaching part 10, 11 are fastened to the bosses 21, 22 by screws 33, 34 which are inserted in the insertion holes 10a, 11a, respectively.

Figure 4:
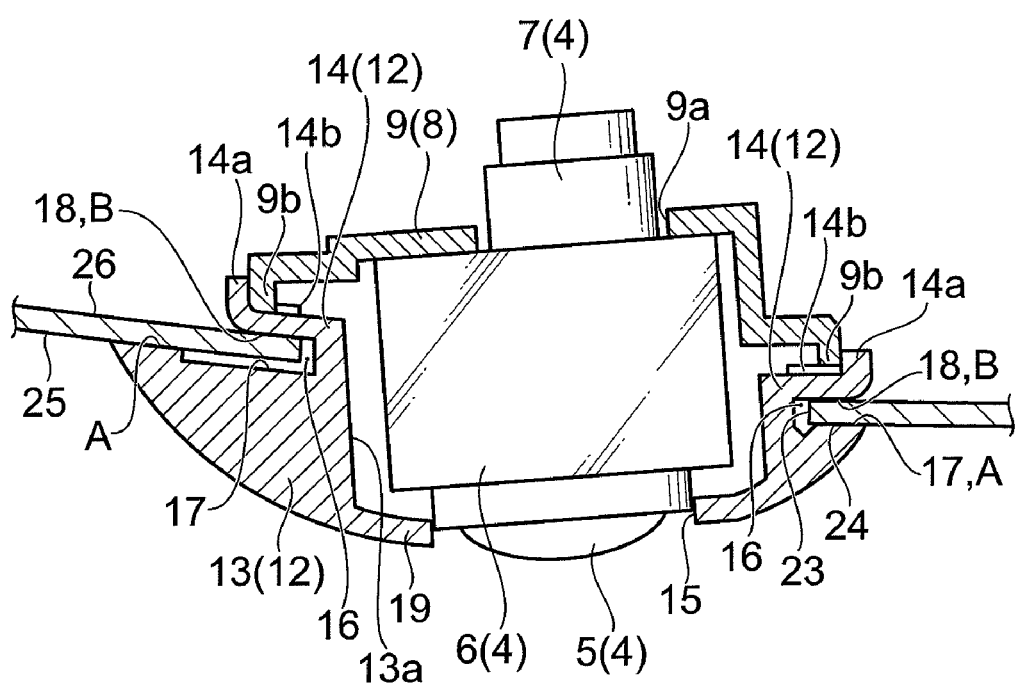
FIG. 4 is a cross-sectional view of FIG. 2 along the line IV-IV.
Figure 6:
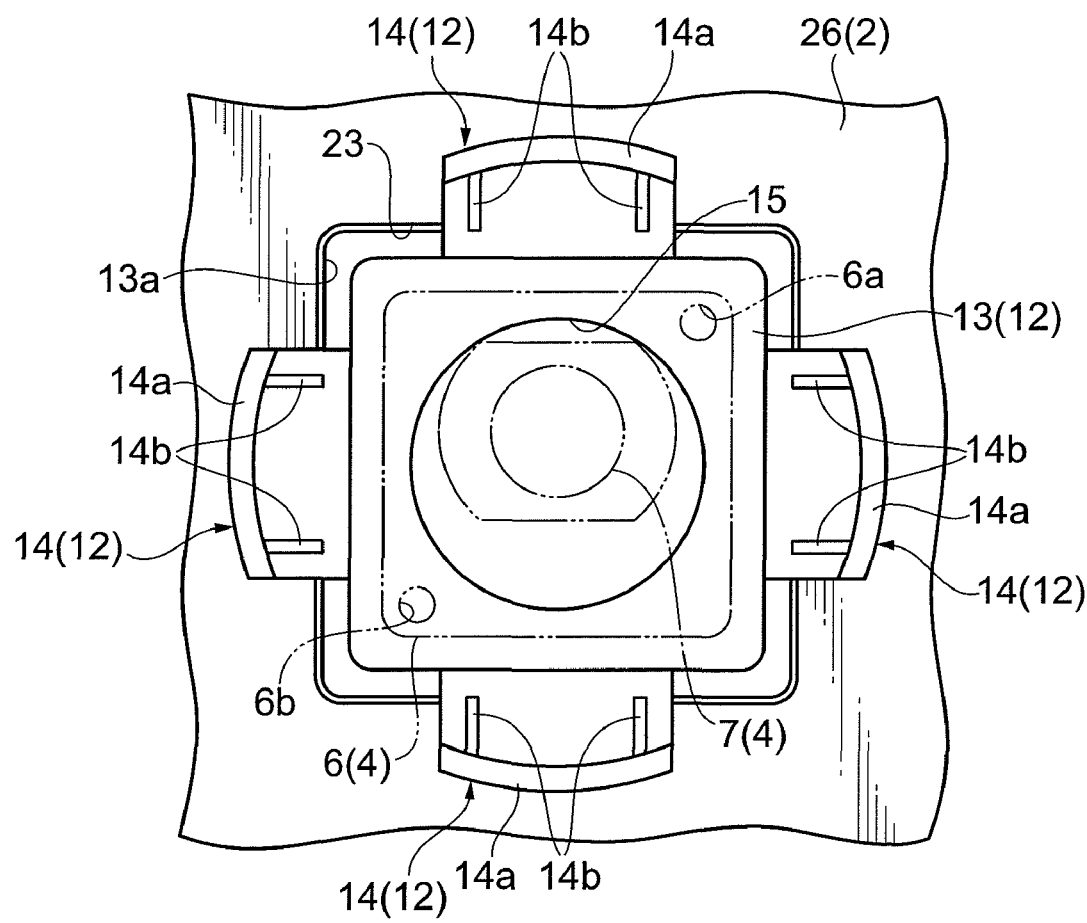
FIG. 6 is a plan view showing attaching state of the camera cover.

As shown in FIGS. 2, 4, and 6, the camera body 6 of the camera 4 is inserted in the through-hole 23 formed in the lower surface of the door mirror body 2. Moreover, a camera cover 12 having an opening part 15 formed for exposing the lens part 5 is attached to the through-hole 23. This camera cover 12 is composed of elastic material, for which ethylene-propylene-diene rubber, or silicone and the like can be included.

The camera cover 12 is composed of a sphere-shaped cover body 13 which is disposed at the side of the outer surface 25 of the door mirror body 2, and four tongue pieces 14 protruding from the body part 13 toward the inside of the door mirror body 2. The outer surface of the body 13 has a streamline shape so as to receive smaller air resistance when the vehicle is running. The first abutting surface A which abuts on the outer surface 25 of the door mirror body 2 is formed in the peripheral edge of the bottom surface of the body part 13. Moreover, a ring-shaped edge part 19 which forms an opening 15 is provided at the top of body 13, and the edge part 19 extends so as to enclose the whole periphery of the lens part 5. A minute gap is formed between the edge part 19 and the lens part 5 so that water in the camera cover 12 is drained to the outside.

Erected portion 14a which is substantially hook-shaped and bent toward the inside of the door mirror body 2 is formed at the end of the tongue piece 14. Each tongue piece 14 is disposed crosswise.

Slot portion 16 is formed respectively between the bottom surface of body part 13 of the camera cover 12 and the each tongue piece 14. The edge part 24 forming through-hole 23 of the door mirror body 2 is inserted into these slot portions 16. In the slot portion 16, the bottom surface 17 of the body part 13 side and the wall surface 18 of the tongue piece 14 side face with each other. The first abutting surface A which abuts on the outer surface 25 of the door mirror body 2 is formed in the bottom surface 17 of the body part 13 side, and the second abutting surface B which abuts on the inner surface 26 of the door mirror body 2 is formed in the wall surface 18 of the tongue piece 14 side.

The space between the first abutting surface A and the second abutting surface B is formed so as to be smaller than the thickness of the edge part 24 of the door mirror body 2. Because of this, the first abutting surface A is pressed firmly onto the outer surface 25 of the door mirror body 2 by elasticity of the camera cover 12, and the second abutting surface B is pressed firmly onto the inner surface 26 of the door mirror body 2 by elasticity of the camera cover 12. Consequently, the camera cover 12 is fixed securely to the door mirror body 2 by the first abutting surface A and the second abutting surface B.

Since the camera cover 12 adopted in the door mirror 1 has the first abutting surface A capable of elastic deformation, matching performance to the configuration of the outer surface 25 of the door mirror body 2 becomes better and accordingly, the gap between the camera cover 12 and the door mirror body 2 can be smaller. As a result, in this door mirror 1, wind noise generation of the door mirror 1 while vehicle running is suppressed and thus the improvement of quietness at the time of running can be achieved. In addition, the structure of the door mirror 1 can be simplified in comparison with the case where sealing material is provided in order to avoid the wind noise.

Moreover, by the adoption of a constitution such that the edge part 24 of the door mirror body 2 enters into the slot part 16 of the camera cover 12 and thus the first abutting surface A and the second abutting surface B are attached to the door mirror body 2 with resilient force, the camera cover 12 is hardly pulled out from the through-hole 23 of the door mirror body 2, which results in the prevention of falling-off of the camera cover 12.

Figure 5:
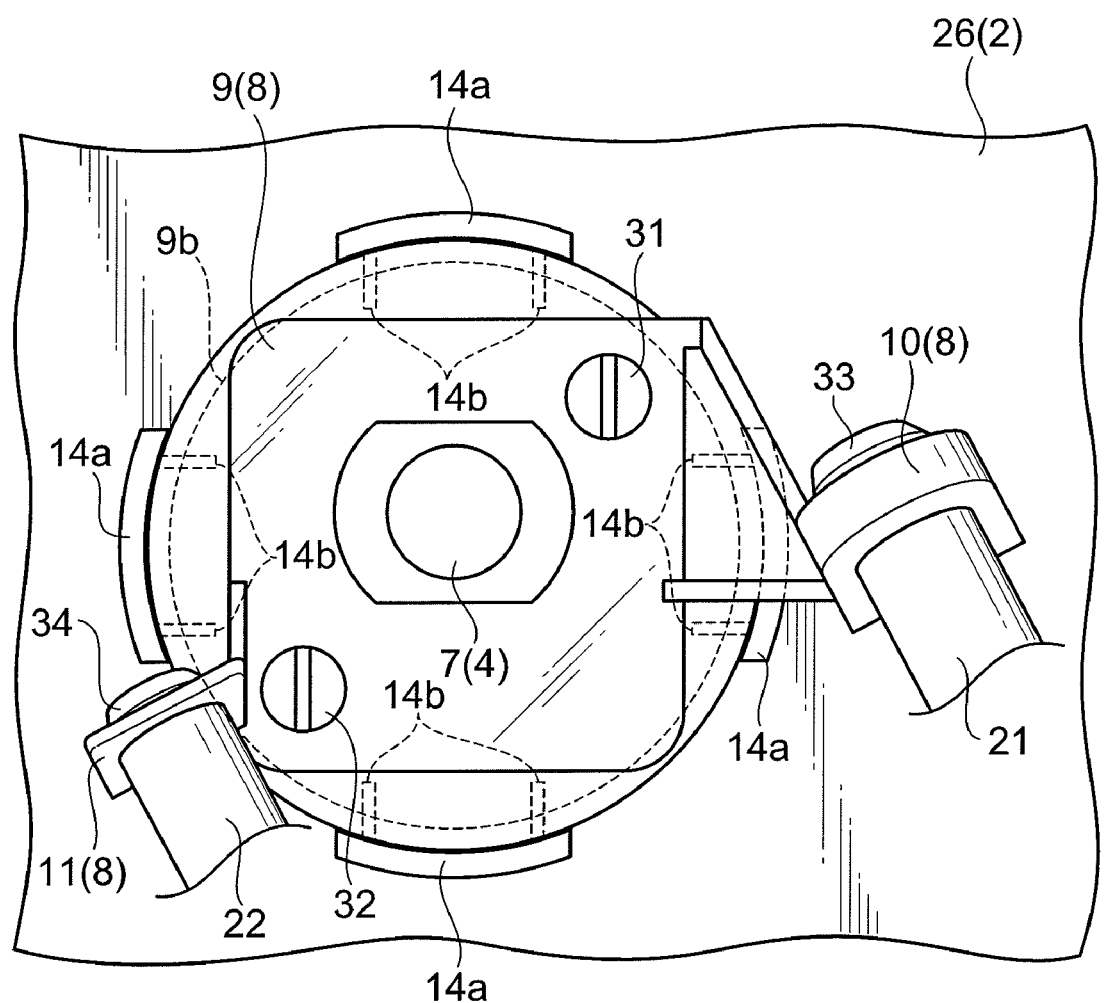
FIG. 5 is a plan view showing attaching state of the bracket.

As shown in FIGS. 4 to 6, erected portions 14a formed at the tip of four tongue pieces 14 are disposed so as to enclose the bracket 8, and the inner side surfaces of these erected portions 14a abut on the outer side surface of the bracket 8. In addition, two straight lip portions 14b, protruding toward the bracket 8 and each having a triangle cross-section, are formed on the tongue pieces 14. The tip of the protruded portion 9b of the bracket 8 abuts on the surface of the tongue piece 14 in a state of squeezing the lip portion 14b of the tongue piece 14, and the squeezing pressure of the lip portion 14b can compress securely the second abutting surface B of the tongue pieces 14 onto the inner surface 26 of the door mirror body 2.

In the door mirror 1 having such a constitution, the squeezing of the tongue piece 14 of the camera cover 12 onto the inner surface 26 of the door mirror body 2 by the protruded portion 9b of the bracket 8 can sandwich the tongue piece 14 with the bracket 8 and the inner surface 26 of the door mirror body 2. Consequently, the camera cover 12 can be fixed firmly onto the door mirror body 2, and thus the prevention of falling-off of the camera cover 12 can be achieved.

A constitution such that the inner side surface of the erected portion 14a of the tongue piece 14 abuts on the outer side surface of the bracket 8 prevents positional deviation of the camera cover 12 at the time of attaching the bracket 8 to the door mirror body 2. Furthermore, even in the case where the thickness of the door mirror body 2 becomes thinner due to design modification or the like, the compression of the lip portion 14b provided on the tongue piece 14 by the protruded portion 9b performs sandwiching operation of the tongue piece 14 by the bracket 8 and the inner surface 26 of the door mirror body 2, which can prevent further falling-off of the camera cover 12.

Next, in the door mirror 1, retrofitting procedure of a camera 4 to the door mirror body 2 which has already been completed will be explained. As shown in FIGS. 3 to 6, first, a through-hole 23 is formed on the door mirror body 2 for fitting a camera 4 into the door mirror body 2. Hereinafter, the camera cover 12 is fitted into the through-hole 23. In this case, the camera cover 12 is fitted such that the edge part 24 forming a through-hole 23 enters into the slot part 16 of the camera cover 12, accordingly the camera cover 12 is sandwiched elastically between the first abutting surface A and the second abutting surface B of the camera cover 2. Hereafter, the camera 4 is fixed to the bracket 8 by screws 31, 32, and in this condition the camera 4 is inserted in the concave part 13a of the camera cover 12. Then, the bracket 8 is fastened to the door mirror body 2 by screws 33, 34. At that time, the protruded portion 9*b* of the bracket 8 presses the second abutting surface B of the tongue piece 14 on the inner surface 26 of the door mirror body 2, and because of this, the tongue piece 14 are sandwiched firmly by the bracket 8 and the inner surface 26 of the door mirror body 2. At the same time, the inner side surface of the erected portion 14*a* of the tongue piece 14 abuts on the outer side surface of the bracket 8. In this way, the camera 4 is attached to the door mirror 1, and thus the attachment of the camera cover 12 is realized without using screw or adhesive agent, which brings about simplified structure of the door mirror 1.

In addition, since the camera cover 12 is made of elastic material, even if a positional deviation of the through-hole 23 is generated against the boss 21, 22 of the door mirror body 2 when forming the through-hole 23 on the door mirror body 2, the camera cover 12 achieves protection of the camera 4 or closure of the opening 15 securely because of elastic deformation performance of the camera cover 12. Therefore, in this door mirror 1, the camera cover 12 can be attached even if the positional accuracy of the through-hole 23, which is formed in a subsequent operation, is somewhat inaccurate.

It is needless to say that the present invention is not limited to the aforementioned embodiments. For example, the camera cover 12 is not limited to the one made only of elastic material, but may be partially composed of resin or metal. Furthermore, the first abutting surface A may be formed in a partial periphery of the camera cover 12, not the whole periphery.

In addition, the bosses 21, 22 for fastening the bracket 8 to the door mirror body 2 by screws are not necessarily dedicated ones for that purpose, but may be used with bosses for fastening other members by screws.

It should be noted that such attachment structure of a camera for door mirror can be applied for attaching not only a camera but also to a lump or a thermometer, to the door mirror.

According to the present invention, quietness performance at the time of driving is enhanced.

What is claimed is:

1. A door mirror, which includes a camera for checking a side of a vehicle which is in a blind spot of a driver, comprising:

a door mirror body having a through-hole formed for lens part side of the camera to be inserted therein; and a camera cover which is attached to the door mirror body and having an opening that exposes the lens part, wherein the camera cover has a first abutting surface that elastically deforms to abut an outer surface of the door mirror body, and wherein the camera cover has a slot portion into which an edge part of the door mirror body that forms the through-hole enters, and a second abutting surface which elastically abuts an inner surface of the door mirror body and is formed in a wall surface of the slot portion such that the door mirror body is sandwiched by the first abutting surface and the second abutting surface.

2. The door mirror according to claim 1, further comprising a bracket which is disposed inside the door mirror body for fixing the camera to the door mirror body, wherein the second abutting surface is pressed onto the inner surface of the door mirror body by the bracket.

\* \* \* \* \*